(12) United States Patent
Wahls et al.

(10) Patent No.: US 7,517,021 B2
(45) Date of Patent: Apr. 14, 2009

(54) RECLINING MECHANISM FOR VEHICLE SEATS

(75) Inventors: Robert Wahls, Commerce Township, MI (US); James S. Wawrzyniak, Warren, MI (US); Kenneth McQueen, Leonard, MI (US); Luke Gajda, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 15 days.

(21) Appl. No.: 11/565,130

(22) Filed: Nov. 30, 2006

(65) Prior Publication Data

US 2008/0073962 A1  Mar. 27, 2008

Related U.S. Application Data

(63) Continuation-in-part of application No. 11/520,336, filed on Sep. 12, 2006.

(51) Int. Cl.
*B60N 2/235* (2006.01)
(52) U.S. Cl. ....................................................... 297/367
(58) Field of Classification Search .................. 297/367
See application file for complete search history.

(56) References Cited

U.S. PATENT DOCUMENTS

| | | |
|---|---|---|
| 5,096,261 A | 3/1992 | Baloche |
| 5,154,475 A | 10/1992 | Kafitz |
| 5,188,571 A | 2/1993 | Boltze et al. |
| 5,277,672 A | 1/1994 | Droulon et al. |
| 5,312,158 A | 5/1994 | Wittig et al. |
| 5,524,970 A | 6/1996 | Kienke et al. |
| 5,573,345 A | 11/1996 | Voss et al. |
| 5,586,833 A | 12/1996 | Vossmann et al. |
| 5,611,747 A | 3/1997 | Bauer et al. |
| 5,622,407 A * | 4/1997 | Yamada et al. .......... 297/367 X |
| 5,634,380 A | 6/1997 | Scholz et al. |

(Continued)

FOREIGN PATENT DOCUMENTS

CN 1070429 9/2001

(Continued)

OTHER PUBLICATIONS

Combined Search and Examination Report dated Dec. 24, 2007 for European Application No. GB 0717511.0.

(Continued)

*Primary Examiner*—Rodney B. White
(74) *Attorney, Agent, or Firm*—Brooks Kushman P.C.

(57) ABSTRACT

A reclining mechanism for a vehicle seat is disclosed with a guide plate pivotally connected to a pivotal plate, which has two internal gear segments. A cam pivotally connects to the pivotal plate, and has a pair of pawls. Two lock elements cooperate with the guide plate, and have an external gear segment to cooperate with the internal gear segments. When the cam rotates, the cam engages the cam pawls with one of the engagement elements unlocking the external gear segments from the internal gear segments. Springs cooperate with the guide plate and the cam for locking the mechanism. A bushing cooperates with the cam and receives a shaft for connecting the reclining mechanism to another reclining mechanism. The cam engages each lock element at two contact points to drive the external gear segments into the internal gear segments when the reclining mechanism is in a locked position.

15 Claims, 6 Drawing Sheets

U.S. PATENT DOCUMENTS

| | | | |
|---|---|---|---|
| 5,634,689 A | 6/1997 | Putsch et al. | |
| 5,681,086 A | 10/1997 | Baloche | |
| 5,685,611 A * | 11/1997 | Eguchi et al. | 297/367 |
| 5,725,452 A | 3/1998 | Droulon et al. | |
| 5,749,624 A * | 5/1998 | Yoshida | 297/367 |
| 5,755,491 A | 5/1998 | Baloche et al. | |
| 5,779,313 A | 7/1998 | Rohee | |
| 5,785,386 A | 7/1998 | Yoshida | |
| 5,810,442 A | 9/1998 | Ito et al. | |
| 5,871,414 A | 2/1999 | Voss et al. | |
| 6,023,994 A * | 2/2000 | Yoshida | 297/367 X |
| 6,024,410 A * | 2/2000 | Yoshida | 297/367 X |
| 6,039,400 A | 3/2000 | Yoshida et al. | |
| 6,076,889 A | 6/2000 | Su et al. | |
| 6,092,874 A | 7/2000 | Kojima et al. | |
| 6,102,480 A | 8/2000 | Asano | |
| 6,149,235 A * | 11/2000 | Fahim | 297/367 X |
| 6,168,235 B1 | 1/2001 | Freund | |
| 6,305,748 B1 | 10/2001 | Ohba | |
| 6,312,053 B1 | 11/2001 | Magyar | |
| 6,328,382 B1 | 12/2001 | Yamashita | |
| 6,328,383 B2 | 12/2001 | Rohee et al. | |
| 6,332,649 B1 * | 12/2001 | Vossmann | 297/367 X |
| 6,364,413 B1 * | 4/2002 | Rohee et al. | 297/367 |
| 6,390,557 B1 * | 5/2002 | Asano | 297/367 |
| 6,454,354 B1 * | 9/2002 | Vossmann et al. | 297/367 |
| 6,474,740 B1 | 11/2002 | Kondo et al. | |
| 6,578,921 B2 | 6/2003 | Koga et al. | |
| 6,579,203 B2 | 6/2003 | Wang et al. | |
| 6,619,743 B1 | 9/2003 | Scholz et al. | |
| 6,634,713 B2 * | 10/2003 | Nonomiya et al. | 297/367 |
| 6,637,821 B2 | 10/2003 | Lee et al. | |
| 6,648,414 B2 * | 11/2003 | Ikegaya et al. | 297/367 |
| 6,666,515 B2 * | 12/2003 | Asano et al. | 297/367 X |
| 6,692,397 B2 | 2/2004 | Wang et al. | |
| 6,715,832 B2 | 4/2004 | Dill | |
| 6,733,077 B2 * | 5/2004 | Asano | 297/367 |
| 6,742,844 B2 * | 6/2004 | Pollack | 297/367 |
| 6,749,263 B2 * | 6/2004 | Peters | 297/367 |
| 6,755,470 B2 | 6/2004 | Iwata et al. | |
| 6,824,216 B2 | 11/2004 | Uramichi | |
| 6,843,533 B1 | 1/2005 | Miyata et al. | |
| 6,854,802 B2 * | 2/2005 | Matsuura et al. | 297/367 |
| 6,883,869 B2 | 4/2005 | Liu et al. | |
| 6,908,156 B1 | 6/2005 | Park et al. | |
| 6,918,635 B2 | 7/2005 | Finner et al. | |
| 6,991,295 B2 * | 1/2006 | Peters | 297/367 |
| 7,055,906 B2 * | 6/2006 | Shinozaki | 297/367 |
| 7,100,987 B2 * | 9/2006 | Volker et al. | 297/367 |
| 7,195,318 B2 * | 3/2007 | Cha et al. | 297/367 |
| 7,222,919 B2 * | 5/2007 | Uramichi et al. | 297/367 |
| 7,261,379 B2 * | 8/2007 | Volker et al. | 297/367 |
| 7,458,639 B2 * | 12/2008 | Thiel et al. | 297/367 |
| 2003/0085603 A1 | 5/2003 | Lee et al. | |
| 2003/0178879 A1 * | 9/2003 | Uramichi | 297/367 |
| 2004/0036338 A1 | 2/2004 | Lardais et al. | |
| 2004/0084945 A1 | 5/2004 | Toba et al. | |
| 2004/0150256 A1 | 8/2004 | Oki et al. | |
| 2005/0110322 A1 | 5/2005 | Cha | |
| 2005/0146287 A1 | 7/2005 | Volker et al. | |
| 2005/0264076 A1 | 12/2005 | Uramichi et al. | |
| 2006/0091713 A1 | 5/2006 | Cha et al. | |

FOREIGN PATENT DOCUMENTS

| | | |
|---|---|---|
| EP | 1 215 076 | 6/2002 |
| WO | WO 2008/086598 | 7/2008 |

OTHER PUBLICATIONS

German Office Action for German Application No. 10 2007 033 025.3-14 dated Sep. 2, 2008.

Office Action for Application No. 2007101545000 dated Jan. 9, 2009.

* cited by examiner

RECLINING MECHANISM FOR VEHICLE SEATS

CROSS-REFERENCE TO RELATED APPLICATIONS

This application is a continuation-in-part of U.S. application Ser. No. 11/520,336 filed Sep. 12, 2006.

BACKGROUND OF THE INVENTION

1. Field of the Invention

The invention relates reclining mechanisms for vehicle seating assemblies, more specifically to manually operated reclining mechanisms.

2. Background Art

Vehicle seats normally include a seat base and a seat back. Reclining mechanisms may be provided for vehicle seats that allow the seats to be positioned to accommodate different body types and the personal comfort of seat occupants. Reclining mechanisms for vehicle seats permit the seat back to pivot to allow a passenger to recline or incline the seat.

Manually operated reclining mechanisms have a locked position in which the seat back cannot pivot and an unlocked position in which the seat back can be pivoted. The mechanism is moved from a locked position to an unlocked position when a user manually operates a reclining mechanism. The mechanism is returned to a locked position after the user finishes adjusting the reclining mechanism. In the locked position, full engagement of the reclining mechanism must be assured.

Reclining mechanisms must meet or exceed performance specifications and must be simple for customers to use. The components of reclining mechanisms must be manufactured to close tolerances to assure acceptable performance. Components that do not meet tolerances requirements for components may lead to inconsistent results, unacceptable levels of scrap, and other manufacturing problems.

The present invention is directed to overcoming the above problems and other problems that are addressed by the embodiments that are summarized below.

SUMMARY OF THE INVENTION

A reclining mechanism for a vehicle seat is provided that has a guide plate adapted to be secured to one of a seat bottom or a seat back and a pivotal plate adapted to be secured to the other of the seat bottom or seat back. The pivotal plate is pivotally connected to the guide plate about a pivotal axis. The pivotal plate is provided with two internal gear segments. A cam is provided that is pivotally connected to the pivotal plate. The cam has at least two cam pawls. Two lock elements are provided which cooperate with the guide plate and the cam for translation relating to the guide plate. The lock elements each have an external gear segment on a radially outwardly oriented portion of each that cooperates with one of the internal gear segments. The lock elements each provide an engagement element that cooperate with the cam pawl. Rotation of the cam causes each of the engagement elements of the cam pawls to move the lock elements radially inwardly. The external gear segments are unlocked from each of the internal gear segments when the lock elements are moved radially inwardly. Two springs are provided that cooperate with the guide plate and the cam for urging the cam to drive the external gear segments into engagement with the internal gear segments. The cam engages each lock element at two contact points to drive the external gear segments into the internal gear segments when the reclining mechanism is in a locked position.

A reclining system for use in a vehicle is provided that has a pair of reclining mechanisms. Each of the pair of reclining mechanisms includes a guide plate that is adapted to be secured to one of a seat bottom or a seat back and a pivotal plate that is adapted to be secured to the other of the seat bottom or seat back. The pivotal plate is connected to the guide plate to pivot about a pivotal axis. The pivotal plate is provided with at least two internal gear segments. A cam is provided with at least two cam pawls and two lock elements that cooperate with the guide plate and the cam. The lock elements each have a radially outwardly oriented gear segment that reflectively engages one of the internal gear segments. Each of the lock elements have an engagement element that cooperates with the cam pawl. The cam is rotated to cause the cam pawls to contact the engagement elements of the lock elements to unlock each of the external gear segments from the internal gear segments. Springs are provided that cooperate with the guide plate and the cam to urge the cam to translate the external gear segments into engagement with the internal gear segments. A bushing cooperates with the cam to assure rotation about the pivotal axis. The bushing is configured to receive a shaft that connects one of the reclining mechanisms to a second reclining mechanism.

A shaft is provided that engages the bushings of the pair of reclining mechanisms to force cooperation between the pair of reclining mechanisms. The bushings are rotated when the shaft is manually rotated which causes each of the cams to rotate. Rotation of the cams causes each of the cam pawls to engage the engagement elements at one contact point. The engagement elements are rotated to pull the lock elements inwardly to unlock the pivotal plates. The pivotal plates, when unlocked, may be pivoted relative to the guide plates.

A seat assembly for use in a vehicle is provided with a seat bottom, a seat back, a pair of reclining mechanisms and a shaft. Each of the reclining mechanisms has a guide plate that is adapted to be secured to the seat bottom and a pivotal plate that is adapted to be secured to the seat back which is pivotally connected to the guide plate about a pivotal axis. Each pivotal plate is provided with two internal gear segments. A cam is provided that has at least two cam pawls. Two lock elements are moved by the cam relative to the guide plate. The lock elements each have an external gear segment that faces radially outwardly to cooperate with one of the internal gear segments. The cam engages each lock element at two contact points to drive the external gear segments into the internal gear segments when the pair of reclining mechanisms is in a locked position. The lock elements each have an engagement element that cooperates with the cam pawl. The cams rotate to cause the cam pawls to engage the engagement elements at one contact point to move the lock elements. The cam rotation unlocks each of the external gear segments from the internal gear segments. Two springs cooperate with the guide plate and the cam to urge the cam to move the external gear segments into engagement with the internal gear segments.

A shaft may engage the bushings of the reclining mechanisms to link the pair of reclining mechanisms. The bushings rotate when the shaft is manually rotated which causes each of the cams to rotate. The cam pawls each engage one of the engagement elements to pull the lock elements and unlock the pivotal plates. Unlocking the pivotal plates allows each of the pivotal plates to move allowing the seat back to be inclined or reclined.

A reclining mechanism is provided for a vehicle seat that has a guide plate that is adapted to be secured to one of a seat bottom or a seat back and a pivotal plate that is adapted to be secured to the other of the seat bottom or seat back. The pivotal plate is pivotally connected to the guide plate about a pivotal axis. The pivotal plate is provided with two internal gear segments. A cam is provided that is pivotally connected to the pivotal plate. The cam provides at least two cam pawls. Two lock elements cooperate with the guide plate and the cam for movement relative to the guide plate. The lock elements each have a radially outwardly oriented external gear segment that cooperates with one of the internal gear segments. The lock elements each have an engagement element that cooperates with the cam pawl. The cam rotates to cause each of the cam pawls to engage one of the engagement elements to move the lock elements radially inwardly. This inward movement unlocks each of the external gear segments from one of the internal gear segments. Two springs cooperate with the guide plate and the cam to urge the cam to translate the external gear segments into engagement with the internal gear segments.

The reclining mechanism may move from an unlocked position to a locked position such that the cam contacts the lock element at only one contact point. The cam urges the lock element radially outward at the only one contact point until the external gear segments are partially engaged with the internal gear segments.

These and other features of the invention will be better understood in view of the attached drawings and the following detailed description of the illustrated embodiment.

DETAILED DESCRIPTION OF EMBODIMENTS OF THE INVENTION

Detailed embodiments are disclosed below but it is to be understood that the disclosed embodiments are merely examples of the invention that may be embodied in various and alternative forms. The figures are not necessarily to scale; some features may be exaggerated or minimized to show details of particular components. The specific structural and functional details are not to be interpreted as limiting, but merely as a representative basis for the claims and to teach one skilled in the art to practice the invention.

Figure 1:
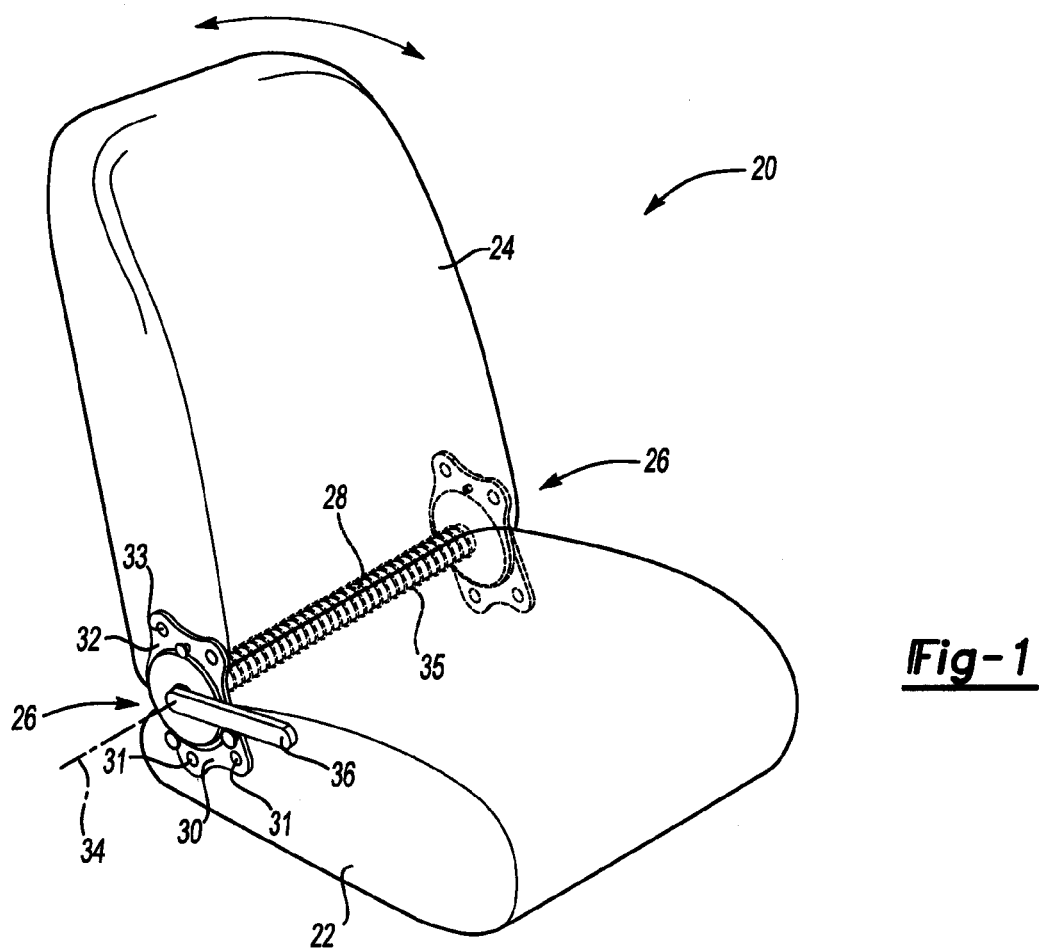
FIG. 1 is a perspective view of a seat assembly.

Referring now to FIG. 1, a seat assembly is illustrated and referenced generally by numeral 20. The seat assembly 20 includes a horizontal seat bottom 22. The seat assembly 20 also includes an upright seat back 24. A pair of reclining mechanisms 26 connect the seat bottom 22 to the seat back 24. The reclining mechanisms 26 are connected together by a shaft 28. The shaft 28 links the reclining mechanisms 26 to lock or unlock the seat back 24 relative to the seat bottom 22.

In one embodiment, the reclining mechanisms 26 each have a guide plate 30, which connects the reclining mechanism 26 to the seat bottom 22. Two connectors 31 link the guide plate 30 to the seat bottom 22. Any suitable means of connecting the guide plate 30 to the seat bottom 22 is contemplated within the scope of the present invention such as a mechanical fastener to a seat frame.

The reclining mechanisms 26 have a pivotal plate 32 connecting the reclining mechanism 26 to the seat back 24. The pivotal plate 32 is connected to the seat back 24 by two connectors 33. Any suitable means of connecting the pivotal plate 32 to the seat back 24 is contemplated within the scope of the present invention.

The guide plate 30 is pivotally connected to the pivotal plate 32 at the pivotal axis 34. The pivotal axis 34 may be generally in the center of the guide plate 30 and the pivotal plate 32. The shaft 28 extends along the pivotal axis 34 and rotates about the pivotal axis 34. The pivotal plate 30 rotates about the pivotal axis 34 and guides rotation the seat back 24 about the pivotal axis 34 to recline or incline.

The reclining mechanism 26 may have a bias spring 35 on the shaft 28. The bias spring 35 locks shaft 28 from rotating until a user raises the lever 36. A user may raise the lever 36 in one direction to overcome the force of the bias spring 35 allowing the shaft 28 to rotate about the pivotal axis 34.

Figure 2:
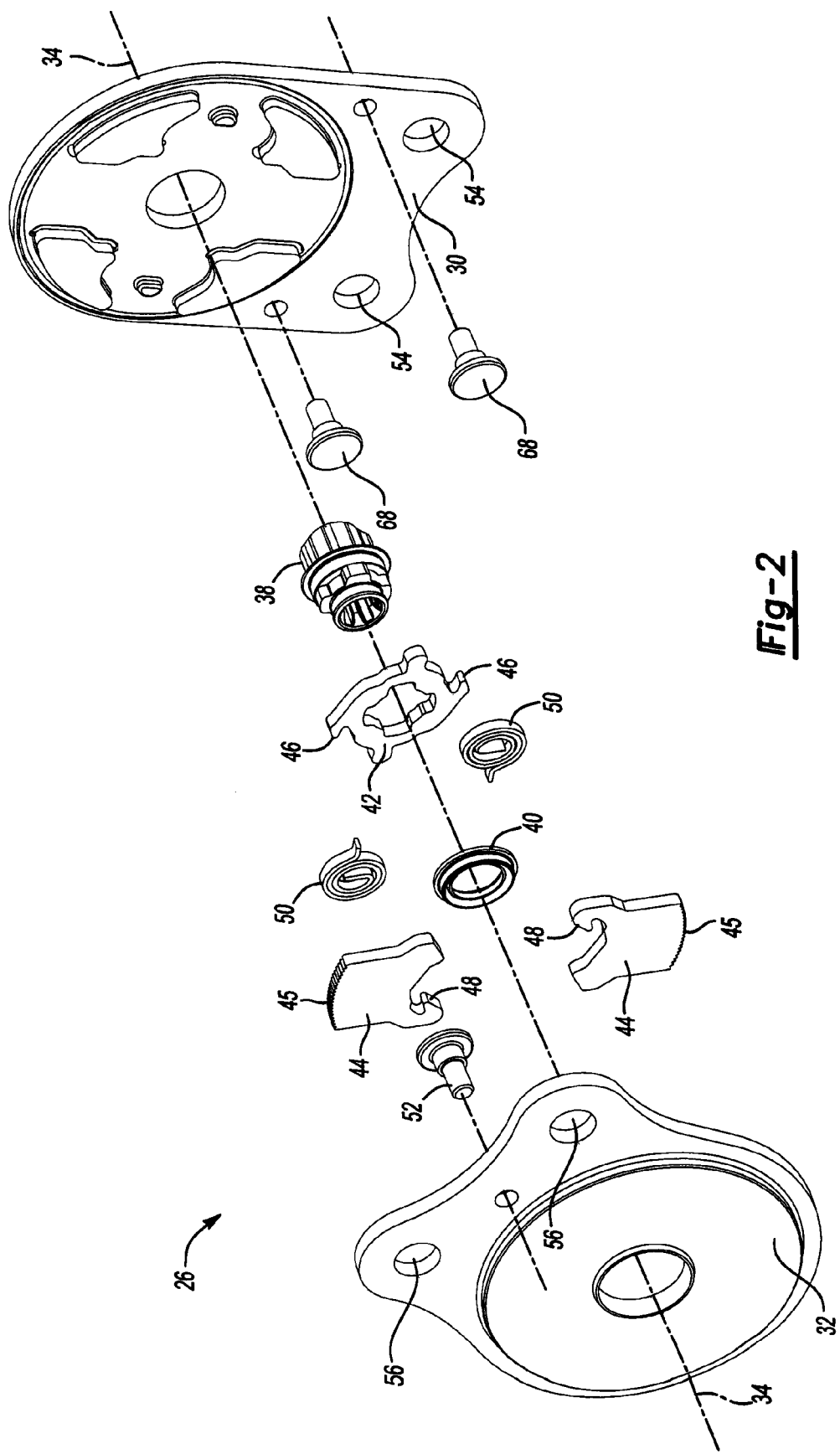
FIG. 2 is an exploded perspective view of a reclining mechanism.
Figure 13:
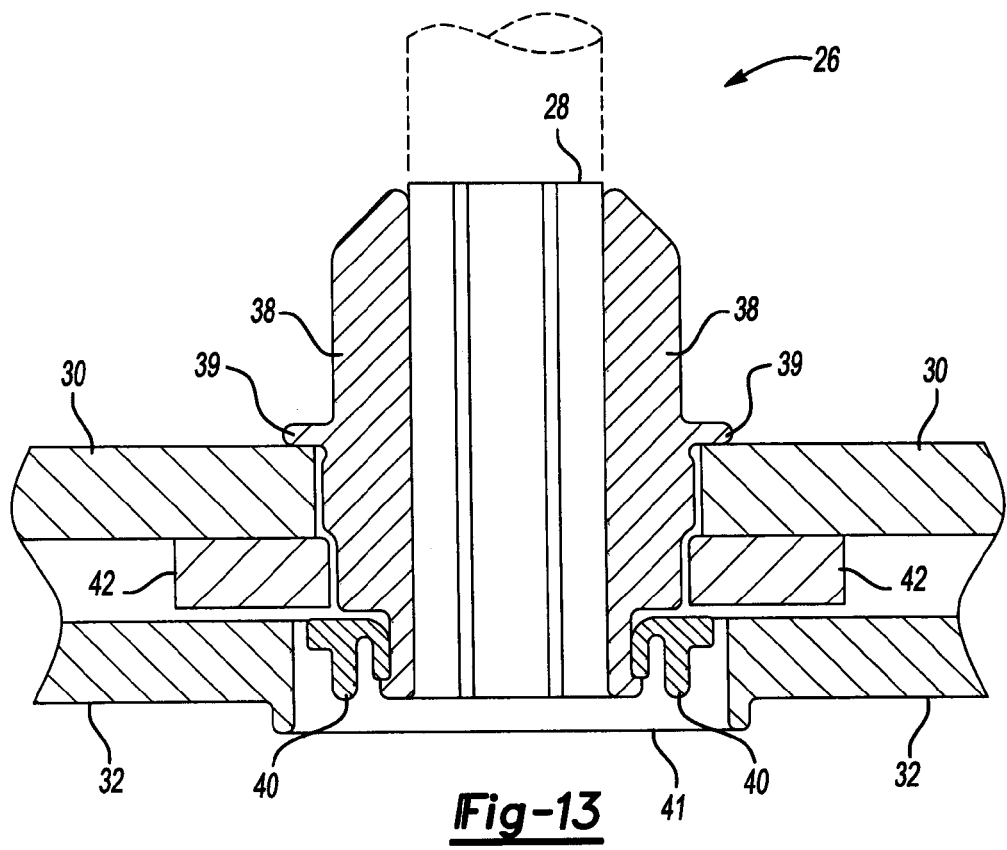
FIG. 13 is a cross-sectional view of the reclining mechanism.

With reference now to FIG. 2, the reclining mechanism 26 is generally housed within the guide plate 30 and the pivotal plate 32. A bushing 38 is connected to the guide plate 30. The bushing 38 is sized to receive a shaft, such as the shaft 28 illustrated in FIG. 1, and may be secured to the pivotal plate 32 by the clip 40. In one embodiment as illustrated in FIG. 13, neither the bushing 38 nor the clip 40 extend beyond the outside housing of the pivotal plate 32.

As shown in FIG. 2, the cam 42 has a central bore sized to receive the bushing 38. A partial clearance may exist between the outer diameter of the bushing 38 and the inner diameter of the cam 42. When the bushing 38 rotates about the pivotal axis 34, the bushing 38 rotates the cam 42 due to a corresponding splined configuration.

Figure 14:
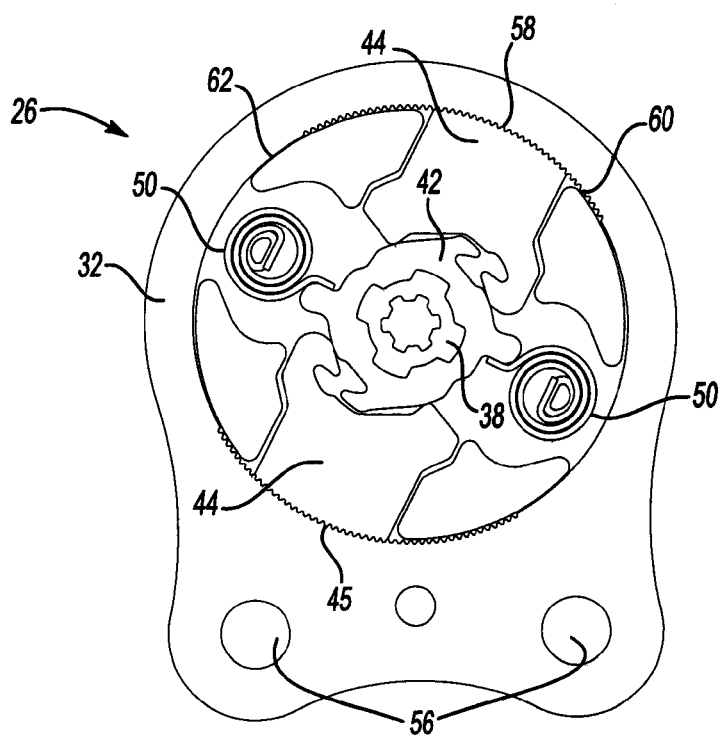
FIG. 14 is an outboard elevation view of the reclining mechanism partially assembled.

The cam 42 rotates two lock elements 44. The lock elements 44 are positioned opposite each other about the pivotal axis 34. The guide plate 30 guides the lock elements 44 in radial movement. When an outer end 45 of one of the lock elements abuts the pivotal plate 32, the pivotal plate 32 cannot rotate about the pivotal axis 34. When the outer end 45 does not contact the pivotal plate 32, the pivotal plate rotates about the pivotal axis 34. The outer ends 45 of the lock elements 44 have an external gear segment 58. As shown in FIG. 14, the external gear segment on the outer end 45 engages with the internal gear segment provided on the inside of the pivotal plate 32.

The cam 42 has a cam pawl 46 and the lock elements 44 have an associated lock pawl 48. When the cam pawl 46 does not engage the lock pawl 48, the cam 42 drives the lock element 44 outward at two contact points so that the outer end 45 contacts the pivotal plate 32. When the cam 42 rotates counterclockwise about the pivotal axis 34, illustrated sequentially in FIGS. 4, 7 and 10, the cam pawl 46 hooks the lock pawl 48 at one contact point, to pull the lock element 44 toward the pivotal axis 34. Pulling the lock element 44 toward the pivotal axis 34 forces the outer end of the lock element 45 out of contact with the pivotal plate 32. The pivotal plate 32 and the associated seat back 24 may rotate about the pivotal axis 34 when the lock element 45 is disengaged from the pivotal plate.

A pair of torsion springs 50 are connected to the guide plate 38 and the cam 42. The springs 50 cause the cam 42 to contact the lock elements 44 at two points and bias the lock elements 44 radially outward and into engagement with pivotal plate 32.

Figure 3:
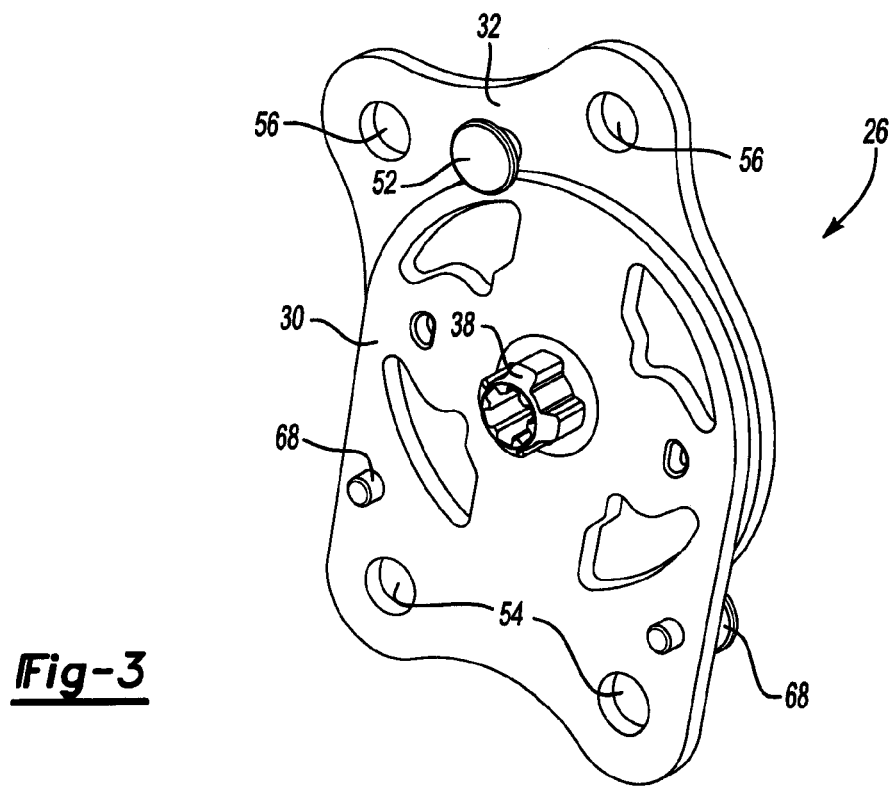
FIG. 3 is an inboard perspective view of an assembled reclining mechanism.

With reference to FIGS. 2 and 3, retainers 52, 68 connect the guide plate 30 and the pivotal plate 32 while allowing the pivotal plate 32 to rotate about the pivotal axis 34 while restricting movement in a transverse direction. At least a first retainer 52 provided through the pivotal plate 32 has a larger portion which overlaps along a peripheral arcuate segment 64 of the guide plate 30 to support the guide plate 30. At least a second retainer 68 provided through the guide plate 30 has a larger portion which overlaps along a peripheral arcuate segment 66 of the pivotal plate 32. The retainers 52, 68 allow limited rotation of the guide plate 30 relative to pivotal plate 32 about the pivotal axis 34.

As illustrated in FIGS. 1 and 3, guide plate holes 54 on the guide plate 30 allow the guide plate 30 to be connected to a seat bottom 22 by connectors 31. Pivotal plate holes 56 are provided on the pivotal plate 32. The pivotal plate holes 56 allow connection of the pivotal plate 32 to a seat back 24 by connectors 33. The number of guide plate holes 54 and pivotal plate holes illustrated here is not a limitation, as any number of holes is contemplated within the scope of the present invention.

Referring to FIG. 3, the guide plate 30 is connected to the pivotal plate 32 by a bushing 38 that extends through the guide plate 30 and the pivotal plate 32. Retainers 52, 68 movably support the guide plate 30 and the pivotal plate 32.

Figure 4:
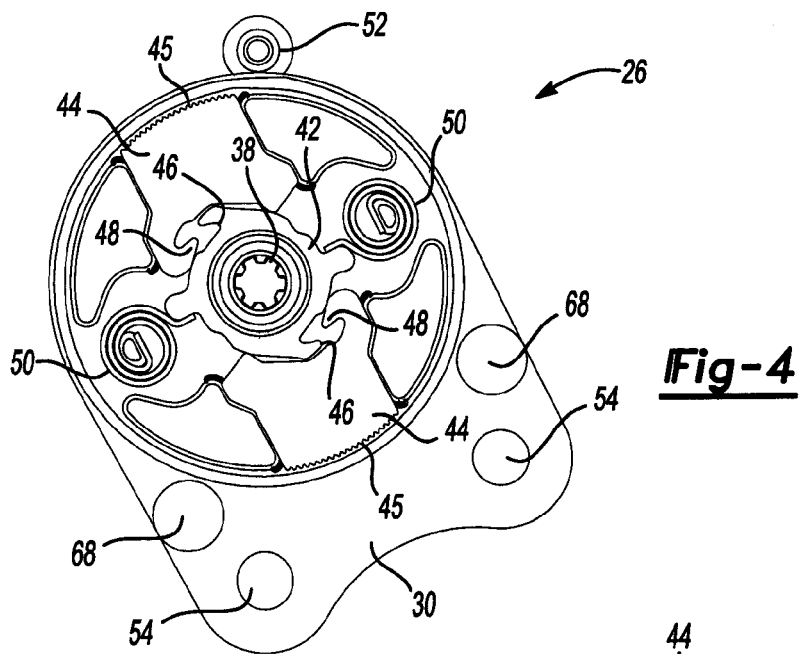
FIG. 4 is an inboard elevation view of the reclining mechanism partially assembled in a locked position.

With reference to FIG. 4, the guide plate 30 is shown with the bushing 38 connected to the cam 42. The cam 42 contacts the lock elements 44 at two locations to drive or push the lock elements 44 outward into a locked position.

Figure 5:
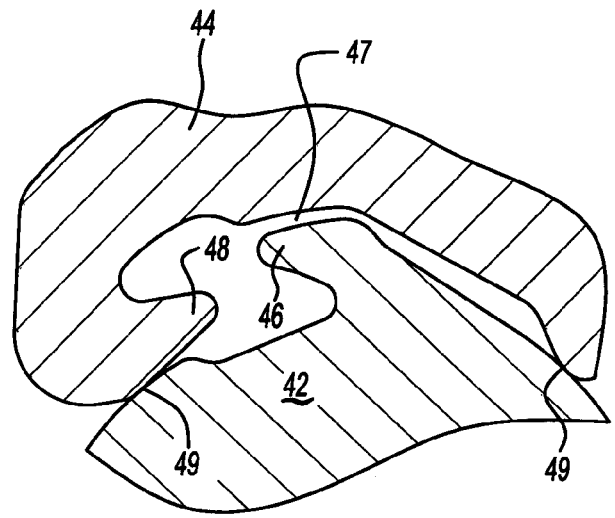
FIG. 5 is a fragmentary cross-sectional view of the cam pawl and a lock pawl of the reclining mechanism of FIG. 4.

In FIG. 5, the cam pawl 46 and the lock pawl 48 are not engaged and the reclining mechanism 26 is locked. The cam 42 contacts the lock elements 44 at two contact points 49 to drive or push the lock elements 44 outward into the locked position. The two contact points 49 may be as far from the center of the lock element 44 as possible to help stabilize the reclining mechanism 26. Clearance 47 is provided between the cam pawl 46 and the lock element 44.

Figure 6:
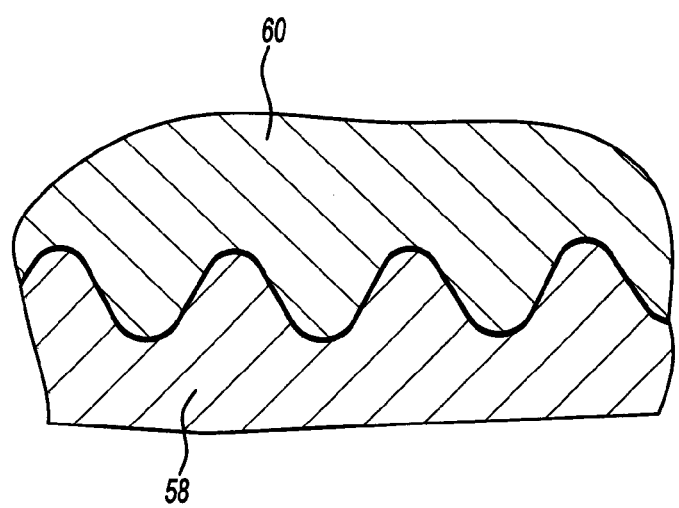
FIG. 6 is a fragmentary cross-sectional view of teeth engagement of the reclining mechanism in a locked position.

Referring to FIG. 6, a partial internal gear segment 60 fully engages an external gear segment 58. As shown in FIG. 5, the two contact points 49 between the cam 42 and the lock element 44 drive the gear segments 58, 60 into full engagement as illustrated in FIG. 6.

Figure 7:
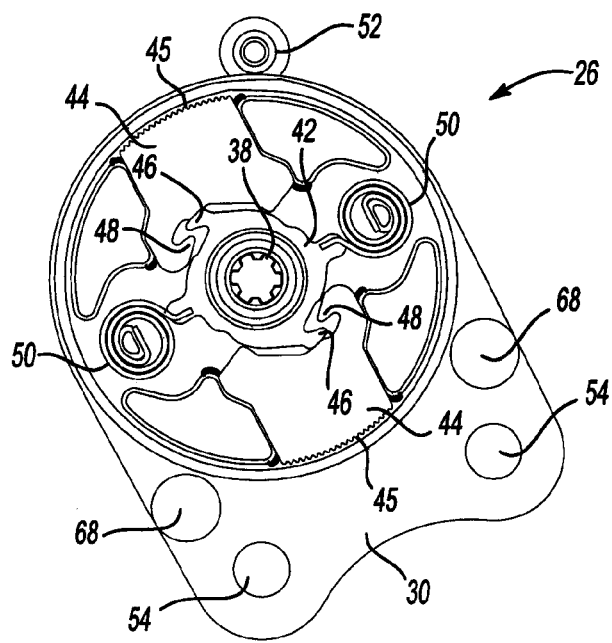
FIG. 7 is an inboard elevation view of the reclining mechanism partially assembled in an intermediate position.

With reference to FIG. 7, an intermediate position or transitional position is illustrated. When the reclining mechanism 26 moves from the locked to unlocked position or from the unlocked to locked position, the cam 42 engages the lock element 44 at a single point 51 and the cam 42 urges the lock element 44 radially outward at the only one contact point 51 until the external gear segments 58 are partially engaged with the internal gear segments 60 as illustrated in FIG. 9.

Figure 8:
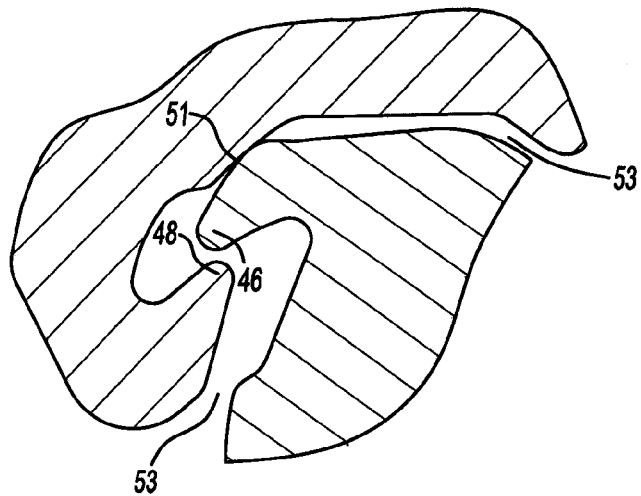
FIG. 8 is a fragmentary cross-sectional view of the cam pawl and lock pawl of the reclining mechanism of FIG. 7.

As shown in greater detail in FIG. 8, the cam pawl 46 and the lock pawl 48 contact at the point 51 in which the reclining mechanism 26 is in the intermediate or transitional position. In this position, two clearances 53 are created between the cam 42 and the lock element 44. The contact point 51 is the single point of contact between the cam 42 and the lock element 44 in the intermediate position.

Figure 9:
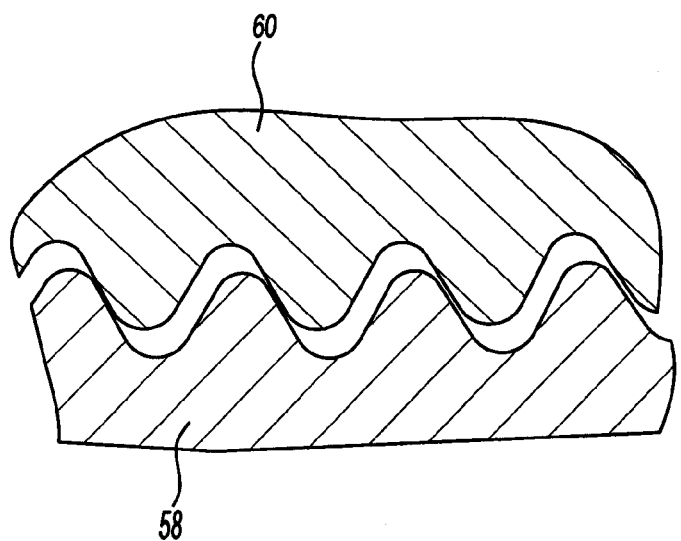
FIG. 9 is a fragmentary cross-sectional view of teeth engagement of the reclining mechanism in the intermediate position.

In FIG. 9, an internal gear segment 60 partially engages the external gear segment 58. The gear segments 58, 60 may be driven into further engagement as shown in FIG. 6 or pulled into disengagement as shown in FIG. 12 from the intermediate position.

Figure 10:
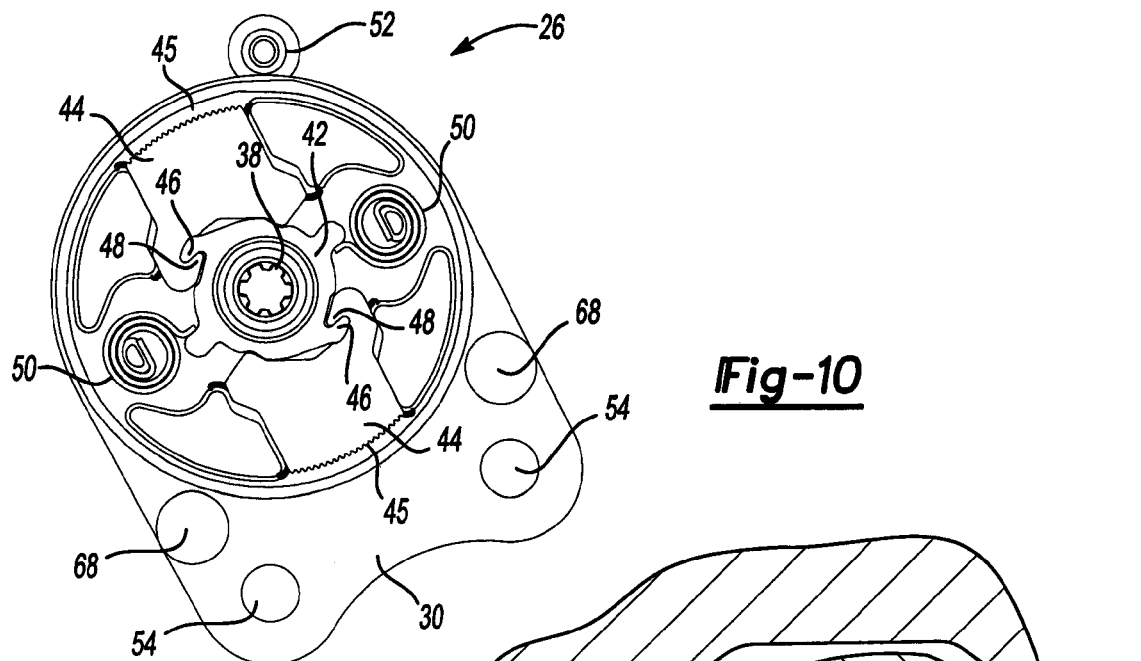
FIG. 10 is an inboard elevation view of the reclining mechanism partially assembled in an unlocked position.

Referring to FIG. 10, the bushing 38 is connected to the cam 42 and the cam 42 is shown full engaging the lock element 44. The outer end of the lock element 45 does not abut the pivotal plate 32, allowing the pivotal plate 32 to rotate. The lock element 45 is pulled radially inward unlocking the pivotal plate 32 and the reclining mechanism 26. The cam 42 contacts the lock element 44 only at the cam pawl 46 and locking pawl 48 in the unlocked position. Full engagement between the cam pawl 46 and the lock pawl 48 pulls the lock element 45 radially inward unlocking the gear segments 58, 60, as in FIG. 12 described below.

Figure 11:
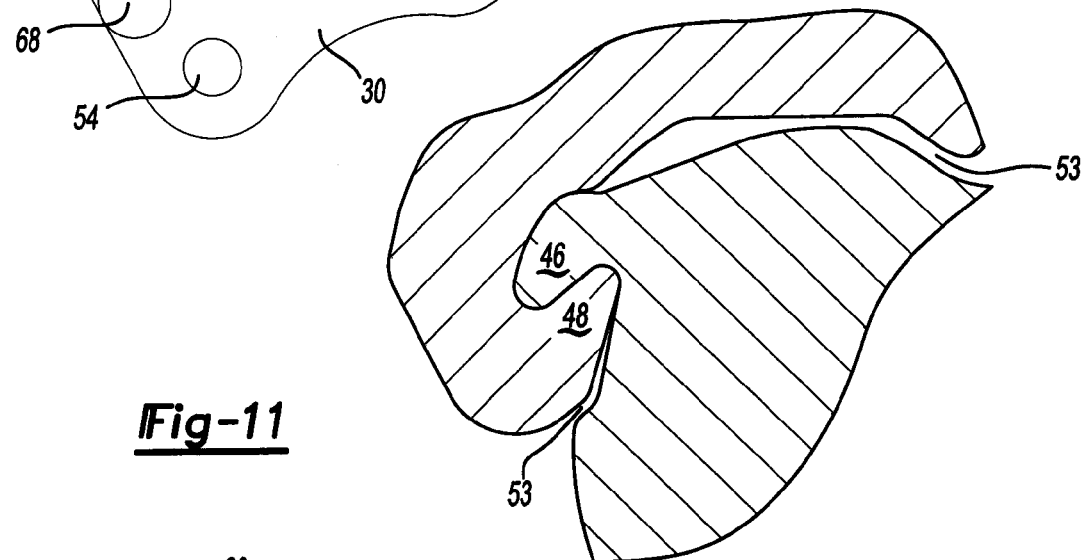
FIG. 11 is a fragmentary cross-sectional view of the cam pawl and lock pawl of the reclining mechanism of FIG. 10.

With reference to FIG. 11, the cam pawl 46 fully engages the lock pawl 48 unlocking the reclining mechanism. Two clearances 53 are provided between the cam 42 and the lock element 44 of FIG. 10.

Figure 12:
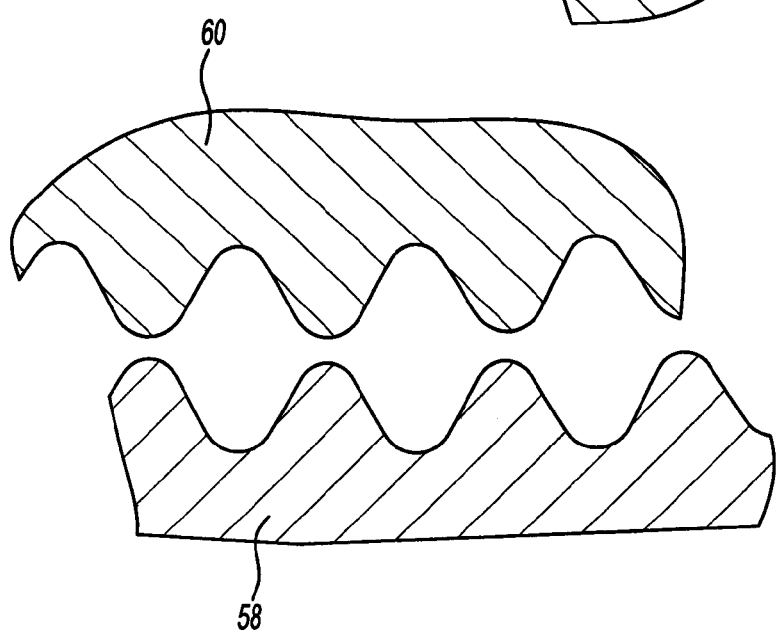
FIG. 12 is a fragmentary cross-sectional view of teeth engagement of the reclining mechanism in the unlocked position.

Referring to FIG. 12, a partial internal gear segment 60 is fully disengaged from the external gear segment 58 unlocking the reclining mechanism an allowing rotation of the reclining mechanism.

With reference to FIG. 13, the reclining mechanism 26 is illustrated in cross-section to the shaft 28 in connection with the bushing 38. The bushing 38 is secured on one side against the guide plate 30 by a shoulder or step 39. The outer end of the bushing 38 may be secured to the reclining mechanism 26 by a retaining clip 40. Neither the bushing 38 nor the clip 40 extends beyond the outer profile 41 of the reclining mechanism 26. The guide plate 30 and the pivotal plate 32 may be oppositely oriented so that the bushing 38 may be mounted to the pivotal plate 32.

Referring to FIG. 14, a partially assembled reclining mechanism 26 is shown. The outer end of the lock elements 45 have an external gear segment 58 that interacts with an internal gear segment 60 of the pivotal plate 32. The internal gear segment 60 of the pivotal plate 32 is on the inside lip 62 of the pivotal plate 32. When the lock element 45 engages the pivotal plate 32, the pivotal plate 32 does not rotate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reclining mechanism for a vehicle seat comprising:
   a guide plate adapted to be secured to one of a seat bottom or a seat back;
   a pivotal plate adapted to be secured to the other of the seat bottom or seat back pivotally connected to the guide plate about a pivotal axis, the pivotal plate has two internal gear segments;
   a shaft;
   a bushing assembled to the shaft, the bushing having a shoulder on a first side of the reclining mechanism that engages one of the guide plates and the pivotal plate;

a retaining clip is assembled to outer ends of the shaft and that engage the other one of the guide plates and the pivotal plate, wherein the bushing and the clip are inboard of the guide plate or the pivotal plate on a second side of the reclining mechanism;

a cam having at least two cam pawls is pivotally disposed between the guide plate and the pivotal plate, the cam being assembled to the bushing;

two lock elements cooperate with the guide plate and the cam for translation relative to the guide plate, the lock elements each have an external gear segment that cooperates with one of the internal gear segments, the lock elements each have an engagement element that cooperates with the cam pawl, wherein rotation of the cam causes each of the cam pawls to engage one of the engagement elements to urge inward radial movement of the lock elements which unlocks each of the external gear segments from one of the internal gear segments; and two springs attached to the guide plate bias the cam pivotally to drive the external gear segments into engagement with the internal gear segments;

wherein the cam engages each lock element at two contact points to drive the external gear segments into the internal gear segments when the reclining mechanism is in a locked position.

2. The reclining mechanism of claim 1 wherein as the cam turns a clearance is created between the cam and the lock element at the two contact points and each of the cam pawls cooperate with one of the engagement elements at one contact point to urge inward radial movement of the lock elements which unlocks each of the external gear segments from one of the internal gear segments.

3. The reclining mechanism of claim 1 wherein each of the cam pawls cooperates with one of the engagement elements at one contact point to move the lock elements radially inwardly to unlock each of the external gear segments from each of the internal gear segments.

4. The reclining mechanism of claim 3 wherein the cam turns a clearance is provided between the cam pawls and each engagement element at each of the one contact point and the cam cooperates with each lock element at two contact points to drive the external gear segments into the internal gear segments when the reclining mechanism is in a locked position.

5. The reclining mechanism of claim 1 further comprising:
at least one retainer provided through the guide plate and the pivotal plate, the at least one retainer overlapping along a peripheral arcuate segment of the guide plate to hold the guide plate to the pivotal plate while limiting separation; and
at least two retainers provided through the guide plate and the pivotal plate, the at least two retainers overlapping along a peripheral arcuate segment of the pivotal plate to hold the pivotal plate to the guide plate while limiting separation.

6. The reclining mechanism of claim 1 further comprising:
at least two retainers provided through the guide plate and the pivotal plate, the at least two retainers overlapping along a peripheral arcuate segment of the guide plate to hold the guide plate to the pivotal plate while limiting separation; and
at least one retainer provided through the guide plate and the pivotal plate, the at least one retainer overlapping along a peripheral arcuate segment of the pivotal plate to hold the pivotal plate to the guide plate while limiting separation.

7. A reclining system for use in a vehicle comprising:
a pair of reclining mechanisms each including:
a guide plate adapted to be secured to one of a seat bottom or a seat back,
a pivotal plate adapted to be secured to the other of the seat bottom or seat back pivotally connected to the guide plate about a pivotal axis, the pivotal plate has two internal gear segments,
a cam having at least two cam pawls is pivotally disposed between the guide plate and the pivotal plate,
two lock elements cooperate with the guide plate and the cam for translation relative to the guide plate, the lock elements each have an external gear segment that cooperates with one of the internal gear segments, the lock elements each have an engagement element that cooperates with the cam pawl, wherein rotation of the cam causes each of the cam pawls to engage one of the engagement elements to urge inward radial movement of the external lock elements which unlocks each of the external gear segments from one of the internal gear segments,
two springs attached to the guide plate bias the cam pivotally to drive the external gear segments into engagement with the internal gear segments,
a bushing assembled to the cam, the bushing having a shoulder that engages the guide plate;
a clip assembled to the bushing at a location that is inboard of the pivotal plate in that the clip and the bushing do not extend outboard of the pivotal plate;
a shaft which engages the bushings of the pair of reclining mechanisms, wherein the bushings are secured to opposite ends of the shaft by the clips, and the shaft causes cooperation between the pair of reclining mechanisms;
wherein the shaft manually rotates, which rotates each of the bushings which causes each of the cams to rotate, which engages each of the cam pawls with each of the engagement elements at one contact point to move the lock elements radially inwardly to unlock each of the pivotal plates allowing the movement of the pivotal plates.

8. The reclining system of claim 7 wherein the cams engage each lock element at two contact points to drive the external gear segments into the internal gear segments when the pair of reclining mechanisms is in a locked position.

9. The reclining system of claim 8 further comprising:
a bias spring in cooperation with the shaft; and
a lever attached to the shaft;
wherein the lever is pressed in one direction which releases the bias spring allowing for the shaft to rotate in one direction.

10. A seat assembly for use in a vehicle comprising:
a seat bottom;
a seat back;
a pair of reclining mechanisms each including:
a guide plate adapted to be secured to one the seat bottom,
a pivotal plate adapted to be secured to the seat back pivotally connected to the guide plate about a pivotal axis, the pivotal plate has two internal gear segments,
a cam having at least two cam pawls is pivotally disposed between the guide plate and the pivotal plate,
two lock elements cooperate with the guide plate and the cam for translation relative to the guide plate, the lock elements each have an external gear segment that cooperates with one of the internal gear segments, wherein the cam engages each lock element at two contact points to drive the external gear segments into the internal gear segments when the pair of reclining mechanisms is in a locked position, the lock elements each have an engagement element that cooperates with the cam pawl, wherein rotation of the cam causes each of the cam pawls to engage one of the engagement elements at one contact point to urge inward radial movement of the external lock elements which unlocks each of the external gear segments from one of the internal gear segments, two springs attached to the guide plate bias the cam pivotally to drive the external gear segments into engagement with the internal gear segments, and a bushing assembled to the cam, the bushing having a step that engages the guide plate; and a retainer clip assembled to the bushing;

a shaft receives the bushings of the pair of reclining mechanisms, wherein the bushings are secured to the shaft by the retainer clips on an outer end of the bushing such that the bushings and the retainer clips are inboard of an outer profile of the reclining mechanisms;

wherein the shaft is manually rotated which rotates each of the bushings which causes each cam of the pair of reclining mechanisms to rotate which engages each of the cam pawls with each of the engagement elements to pull each of the two lock elements to unlock each of the pivotal plates to allow of the movement of each of the pivotal plates whereby allowing an incline or recline of the seat back.

11. A reclining mechanism for a vehicle seat comprising:

a guide plate adapted to be secured to one of a seat bottom or a seat back;

a pivotal plate adapted to be secured to the other of the seat bottom or seat back pivotally connected to the guide plate about a pivotal axis, the pivotal plate has two internal gear segments;

a cam having at least two cam pawls is pivotally disposed between the guide plate and the pivotal plate;

two lock elements cooperate with the guide plate and the cam for translation relative to the guide plate, the lock elements each have an external gear segment that cooperates with one of the internal gear segments, the lock elements each have an engagement element that cooperates with the cam pawl, wherein rotation of the cam causes each of the cam pawls to engage one of the engagement elements to urge inward radial movement of the external lock elements which unlocks each of the external gear segments from one of the internal gear segments; and two springs attached to the guide plate bias the cam pivotally to drive the external gear segments into engagement with the internal gear segments;

wherein the reclining mechanism moves from an unlocked position to a locked position such that the cam contacts each lock element at only one contact point and the cam urges each lock element radially outward at the only one contact point until the external gear segments are partially engaged with the internal gear segments.

12. The reclining mechanism of claim 11 wherein the reclining mechanism has a locked position such that the cam contacts each lock element at two contact points to drive the external gear segments into the internal gear segments for full engagement.

13. The reclining mechanism of claim 11 wherein the reclining mechanism has an unlocked position such that the cam pawls contacts the engagement elements at each one contact point to urge inward radial movement of the lock elements which unlocks the external gear segments from the internal gear segments.

14. The reclining system of claim 11 further comprising:

at two one retainers connected through each of the guide plates and the pivotal plates, the at least two retainers overlapping along a peripheral arcuate segment of each of the guide plates to hold each of the guide plates to each of the pivotal plates while limiting separation; and at least one retainer connected through each of the guide plates and the pivotal plates, the at least one retainer overlapping along a peripheral arcuate segment of each of the pivotal plates to hold each of the pivotal plates to each of the guide plates while limiting separation.

15. The reclining system of claim 11 further comprising:

at least one retainer connected through each of the guide plates and the pivotal plates, the at least one retainer overlapping along a peripheral arcuate segment of each of the guide plates to hold each of the guide plates to each of the pivotal plates while limiting separation; and at least two retainers connected through each of the guide plates and the pivotal plates, the at least two retainers overlapping along a peripheral arcuate segment of each of the pivotal plates to hold each of the pivotal plates to each of the guide plates while limiting separation.

* * * * *

UNITED STATES PATENT AND TRADEMARK OFFICE
CERTIFICATE OF CORRECTION

PATENT NO. : 7,517,021 B2  Page 1 of 1
APPLICATION NO. : 11/565130
DATED : April 14, 2009
INVENTOR(S) : Robert Wahls et al.

It is certified that error appears in the above-identified patent and that said Letters Patent is hereby corrected as shown below:

Column 9, line 28, Claim 10:

Delete "reline" and insert -- recline --.

Column 10, line 25, Claim 14:

Delete "at two one" and insert -- at least two --.

Signed and Sealed this

Thirtieth Day of June, 2009

JOHN DOLL
*Acting Director of the United States Patent and Trademark Office*